US012668999B2

(12) United States Patent
Yamazaki

(10) Patent No.: US 12,668,999 B2
(45) Date of Patent: Jun. 30, 2026

(54) POWER DOOR-LOCK SYSTEM

(71) Applicant: SUBARU CORPORATION, Tokyo (JP)

(72) Inventor: Hitomi Yamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/625,072

(22) Filed: Apr. 2, 2024

(65) Prior Publication Data

US 2024/0344371 A1 Oct. 17, 2024

(30) Foreign Application Priority Data

Apr. 13, 2023 (JP) ................................. 2023-065622

(51) Int. Cl.
*H04W 12/65* (2021.01)
*E05B 81/56* (2014.01)
(Continued)

(52) U.S. Cl.
CPC .............. *E05B 81/56* (2013.01); *E05B 81/76* (2013.01); *H04W 12/65* (2021.01); *H04W 12/67* (2021.01)

(58) Field of Classification Search
CPC .......... E05B 81/56; E05B 81/76; E05B 77/48; E05B 85/08; E05B 43/005; E05B 45/0605; E05B 77/24; E05B 77/28; E05B 77/287; E05B 77/30; E05B 81/00; E05B 81/25; E05B 81/54; E05B 81/64; E05B 81/70; E05B 81/77; E05B 83/36; E05B 85/02; Y10T 70/625; Y10T 70/7062; Y10T 70/7113; Y10T 74/18592; H03K 17/945; H03K 2217/94005; G07C 9/00182; E05F 15/40; E05F 15/60; E05F 15/70; E05F 15/73; E05F 15/76; E05F 2015/763; E05F 2015/767; B60R 16/023; B60R 2325/101; B60R 2325/205; B60R 25/01;
(Continued)

(56) References Cited

U.S. PATENT DOCUMENTS

| | | | |
|---|---|---|---|
| 2016/0140649 A1* | 5/2016 | Kleve | .................... H04W 12/06 705/307 |
| 2017/0217360 A1* | 8/2017 | Pierfelice | ................. B60Q 1/46 |
| 2023/0202569 A1* | 6/2023 | Kovie | ................... E05C 17/006 280/164.1 |

FOREIGN PATENT DOCUMENTS

JP 2009-084907 A 4/2009

* cited by examiner

*Primary Examiner* — Dionne Pendleton
(74) *Attorney, Agent, or Firm* — Rimon P.C.

(57) ABSTRACT

A power door-lock system includes a door-lock controller, a current position data obtainer, a security data obtainer, and a security situation identifier. The door-lock controller controls door-lock of a vehicle. The current position data obtainer acquires position data regarding a current position of the vehicle. The security data obtainer acquires security data regarding a region including the current position of the vehicle. The security situation identifier identifies a security situation of the current position of the vehicle based on the position data and the security data. The power door-lock system determines, based on the security situation identified by the security situation identifier, transition time from a door-unlocked state of the vehicle after a determination that a driver has got off to power door-lock, and allows the door-lock controller to make the power door-lock after an elapse of the transition time.

9 Claims, 4 Drawing Sheets

(51) Int. Cl.
*E05B 81/76*       (2014.01)
*H04W 12/67*      (2021.01)

(58) Field of Classification Search
CPC ............ B60R 25/2018; B60R 25/2045; B60R
25/245; B60P 1/43; B60P 1/4471; B60J
5/06; B60C 25/025; A62B 3/005; E05Y
2900/531; E05Y 2400/45; E05Y 2400/52;
E05Y 2400/66; E05Y 2400/852; E05Y
2400/86; E05Y 2800/254; E05Y 2900/55
See application file for complete search history.

POWER DOOR-LOCK SYSTEM

CROSS-REFERENCE TO RELATED APPLICATIONS

The present application claims priority from Japanese Patent Application No. 2023-065622 filed on Apr. 13, 2023, the entire contents of which are hereby incorporated by reference.

BACKGROUND

The disclosure relates to a power door-lock system to be used for door-lock of a vehicle.

There has been known a system that makes power door-lock of a vehicle to save a user from making a door-lock operation by themselves, as a countermeasure against theft of the vehicle itself or theft of money and valuables in the vehicle. For example, reference is made to Japanese Unexamined Patent Application Publication (JP-A) No. 2009-84907.

In this existing technique, the system makes the power door-lock of the vehicle when a key device that makes door-lock and door-unlock of the vehicle is away from the vehicle by a predetermined distance or more. In this case, the vehicle is automatically door-locked even when the user does not perform the lock operation by using the key device.

SUMMARY

An aspect of the disclosure provides a power door-lock system including a door-lock controller, a current position data obtainer, a security data obtainer, and a security situation identifier. The door-lock controller is configured to control door-lock of a vehicle. The current position data obtainer is configured to acquire position data regarding a current position of the vehicle. The security data obtainer is configured to acquire security data regarding a region including the current position of the vehicle. The security situation identifier is configured to identify a security situation of the current position of the vehicle based on the position data and the security data. The power door-lock system is configured to determine, based on the security situation identified by the security situation identifier, transition time from a door-unlocked state of the vehicle after a determination that a driver of the vehicle has got off to power door-lock, and allow the door-lock controller to make the power door-lock after an elapse of the transition time.

An aspect of the disclosure provides a power door-lock system including circuitry and a communicator. The circuitry is configured to control door-lock of a vehicle. The communicator is configured to acquire position data regarding a current position of the vehicle and security data regarding a region including the current position of the vehicle. The circuitry is configured to identify a security situation of the current position of the vehicle based on the position data and the security data. The circuitry is configured to determine, based on the identified security situation, transition time from a door-unlocked state of the vehicle after a determination that a driver of the vehicle has got off to power door-lock, and make the power door-lock after an elapse of the transition time.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
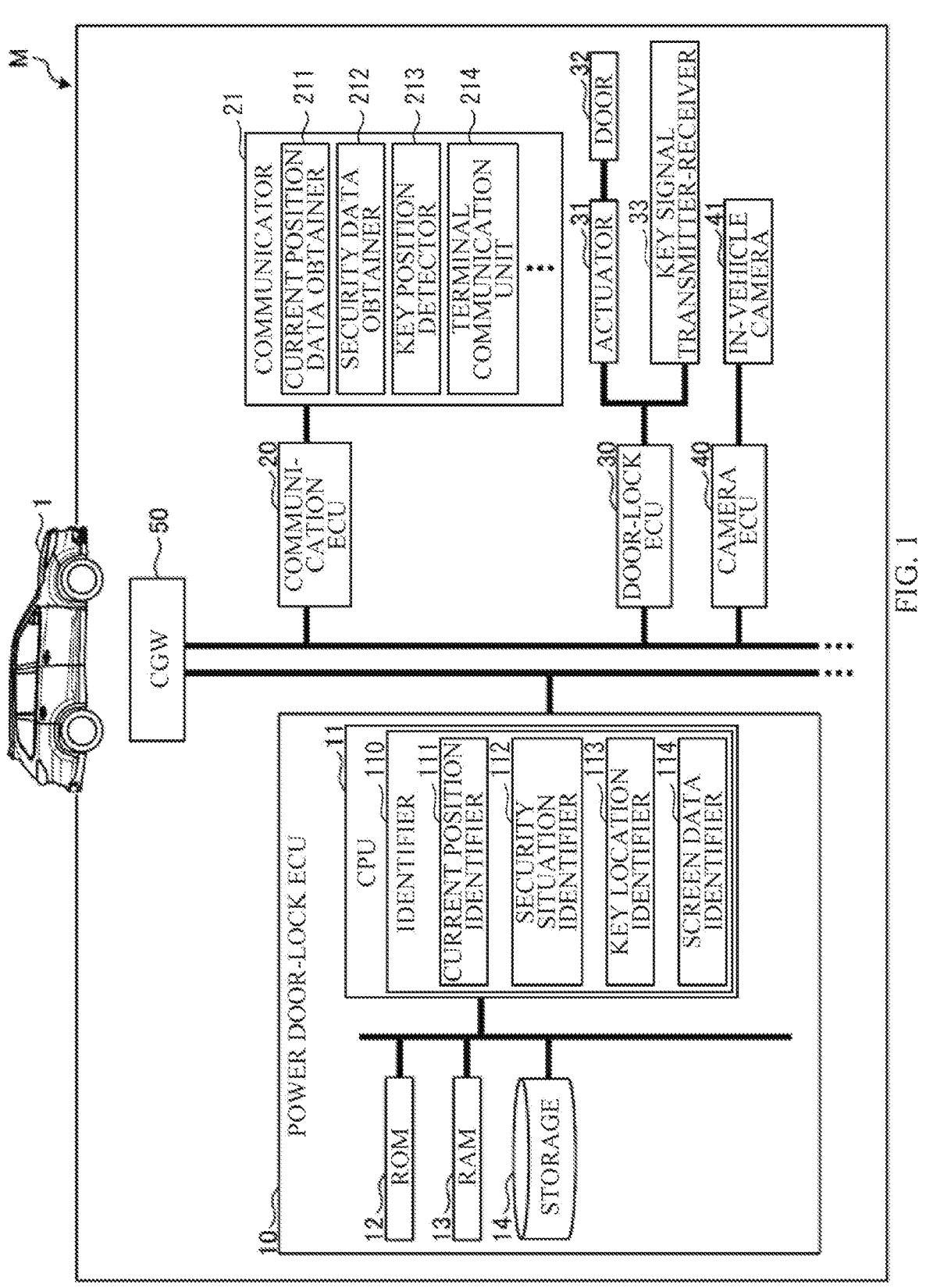
FIG. 1 is a block diagram of a configuration of a power door-lock system according to an embodiment of the disclosure.

In the existing technique mentioned above, the power door-lock of the vehicle is made when the key device is away from the vehicle by the predetermined distance or more. However, when the user has something to do within the predetermined distance from a place where the vehicle is stopped, e.g., when the user gets off the vehicle and makes a call using a portable terminal, or when the user buys something with a vending machine within the predetermined distance from a position where the vehicle is stopped, the key device is within the predetermined distance from the vehicle. Accordingly, the power door-lock of the vehicle is not made, and there is still a concern about theft prevention.

A possible measure against such a concern may be to make the power door-lock as soon as the user gets off the vehicle. In this case, however, the vehicle repeats the door-lock and the door-unlock every time the user only temporarily leaves the vehicle, or every time the user wants to retrieve a forgotten item in the vehicle immediately after getting off the vehicle. This may make the user feel troublesome.

It is desirable to provide a power door-lock system that makes it possible to control power door-lock based on a security situation of a current position of a vehicle and suppress the user from feeling troublesome while suppressing vehicle-related theft.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A power door-lock system M according to an embodiment of the disclosure may include multiple in-vehicle ECUs (Electronic Control Units) to be mounted on a vehicle 1.

As illustrated in FIG. 1, on the vehicle 1, the multiple in-vehicle ECUs may be mounted. The in-vehicle ECUs include multiple ECUs and a central gateway (CGW) 50. The CGW 50 serves as a relay device that relays communication between the ECUs, and communication between the ECUs and the outside of the vehicle. The multiple ECUs and the CGW 50 are communicatably coupled together by an in-vehicle network. Each of the in-vehicle ECUs may include, for example, a processor such as a CPU (Central Processing Unit) or an MPU (Micro Processing Unit), electric circuitry, and a storage such as a RAM (Random Access Memory) and a ROM (Read Only Memory). Moreover, all or a part of the operation to be carried out by the in-vehicle ECUs may be realized by hardware such as an ASIC (Application Specific Integrated Circuit), an FPGA (Field-Programmable Gate Array), or a GPU (Graphics Processing Unit).

The power door-lock system M may transmit various door-lock signals from a power door-lock ECU 10 to a door-lock ECU 30. The door-lock ECU 30 may allow an actuator 31 to make door-lock of a door 32 in accordance with the received signals. Thus, the power door-lock system M may make various door-lock controls in accordance with the signals.

The vehicle 1 may include a communicator 21 and a communication ECU 20. The communicator 21 may transmit and receive data to and from the outside. The communication ECU 20 may control the communicator 21. The communicator 21 may include at least a current position data obtainer 211, a security data obtainer 212, a key position detector 213, and a terminal communication unit 214.

The current position data obtainer 211 may acquire current position data regarding the vehicle 1 by a GNSS (Global Navigation Satellite System), e.g., the GPS (Global Positioning System). The GNSS may identify a current position by receiving radio waves from artificial satellites at predetermined time intervals. The data acquired by the current position data obtainer 211 may be transmitted to the current position identifier 111 and the security situation identifier 112 of the power door-lock ECU 10. The current position identifier 111 and the security situation identifier 112 are described later.

The security data obtainer 212 may communicate with, for example, external big data, and acquire security data such as the number of vehicle theft cases in a predetermined period for each region or area including the current position of the vehicle 1. The data acquired by the security data obtainer 212 may be transmitted to the security situation identifier 112 of the power door-lock ECU 10.

The key position detector 213 may transmit, at predetermined time intervals, detection radio waves to detect a key device, detect a key device in a detection area, and acquire position data regarding the key device. The key device is assumed to be a smart key or a digital key. The smart key may make door-lock and door-unlock of the vehicle 1. The digital key may be, for example, a terminal configured to make the door-lock and the door-unlock. The data acquired by the key position detector 213 may be transmitted to the key position identifier 113 of the power door-lock ECU 10. The key position identifier 113 is described later.

The terminal communication unit 214 may communicate with a terminal registered in the vehicle 1, and notify mainly a terminal carried by the driver of, for example, a state of the vehicle 1. For example, when the vehicle 1 is in a door-unlocked state, the terminal communication unit 214 may notify mainly the terminal carried by the driver of the door-unlocked state.

The vehicle 1 may include the actuator 31, a key signal transmitter-receiver 33, and the door-lock ECU 30. The actuator 31 may make the door-lock and the door-unlock of the door 32. The key signal transmitter-receiver 33 may transmit and receive signals of the door-lock and the door-unlock to and from the key device. The door-lock ECU 30 may control the actuator 31 and the key signal transmitter-receiver 33. For example, when the key signal transmitter-receiver 33 receives the door-unlock signal from the key device and the vehicle 1 authenticates the key device, the door-lock ECU 30 may output a signal commanding the actuator 31 to make the door-unlock of the door 32. The signal may allow the actuator 31 to operate, causing the door-unlock of the door 32. Moreover, the door-lock ECU 30 may receive a signal from the power door-lock ECU 10, and output a signal to allow the actuator 31 to make the door-lock of the door 32. The signal may allow the actuator 31 to operate, causing the door-lock of the door 32.

The vehicle 1 may include an in-vehicle camera 41 and a camera ECU 40. The in-vehicle camera 41 may capture an image of the inside and the surroundings of the vehicle 1. The camera ECU 40 may control the in-vehicle camera 41. For example, the in-vehicle camera 41 may capture an action of a driver or capture an occupant. Screen data captured by the in-vehicle camera 41 may be transmitted to a screen data identifier 114 of the power door-lock ECU 10. The screen data identifier 114 is described later.

The power door-lock ECU 10 mounted on the vehicle 1 may include a CPU 11, a ROM 12, a RAM 13, and a storage 14. The CPU 11 may carry out various kinds of processing based on programs held in the ROM 12. In this embodiment, the CPU 11 may read the programs held in the ROM 12 into a memory such as the RAM 13 and carry out the processing.

The CPU 11 provided in the power door-lock ECU 10 may include an identifier 110. The identifier 110 may identify data acquired by the in-vehicle ECUs mounted on the vehicle 1. The power door-lock ECU 10 may transmit the signal to the door lock ECU 30 based on an identification result by the identifier 110, and the door-lock ECU 30 may allow the actuator 31 to make the door-lock corresponding to the received signal. A control of the door-lock is described with reference to a processing flow of a power door-lock control in FIG. 2.

The identifier 110 may include the current position identifier 111, the security situation identifier 112, the key position identifier 113, and the screen data identifier 114.

The current position identifier 111 may determine whether or not the current position of the vehicle 1 is a specific position, by using the current position data acquired by the current position data obtainer 211. The specific position may be predetermined facilities or a predetermined place. The specific position is assumed to be, for example, facilities such as a gas station or a charging station, and a parking lot. In contrast, a place other than the specific position is assumed to be, for example, on the road. An identification result of the specific position may be used to determine whether or not to blink a hazard lamp when making the power door-lock of the vehicle 1, in the processing of the power door-lock control described later.

The security situation identifier 112 may identify a security situation of the current position of the vehicle, e.g., a risk level, based on the data acquired by the current position data obtainer 211 and the security data obtainer 212. The identification of the risk level by using the security data may be made in three stages: Level "1" to Level "3". Level "1" is determined as the risk level "low". Level "2" is determined as the risk level "medium". Level "3" is determined as the risk level "high". As Level becomes higher, the place has the higher risk level. In this example, the identification is made in the three stages, but the identification may be made in more subdivided stages, or alternatively, the identification of the risk level may be made in two stages, i.e., high and low.

The key position identifier 113 may identify the position of the key device based on the data acquired by the key position detector 213. For example, the key position identifier 113 may determine whether the key device is located inside the vehicle 1 or whether the key device is located outside the vehicle 1, based on the position data regarding the key device acquired by the key position detector 213. When there are multiple key devices, the key position identifier 113 may identify the positions of the respective key devices.

The screen data identifier 114 may identify the driver's action and identify occupants by using the screen data captured by the in-vehicle camera 41. For example, the identification of the driver's action may include determining whether or not the driver has got off. When there are other occupants, the screen data identifier 114 may determine whether the occupant is an adult, whether the occupant is a child, or whether the occupant is a pet.

Figure 2:
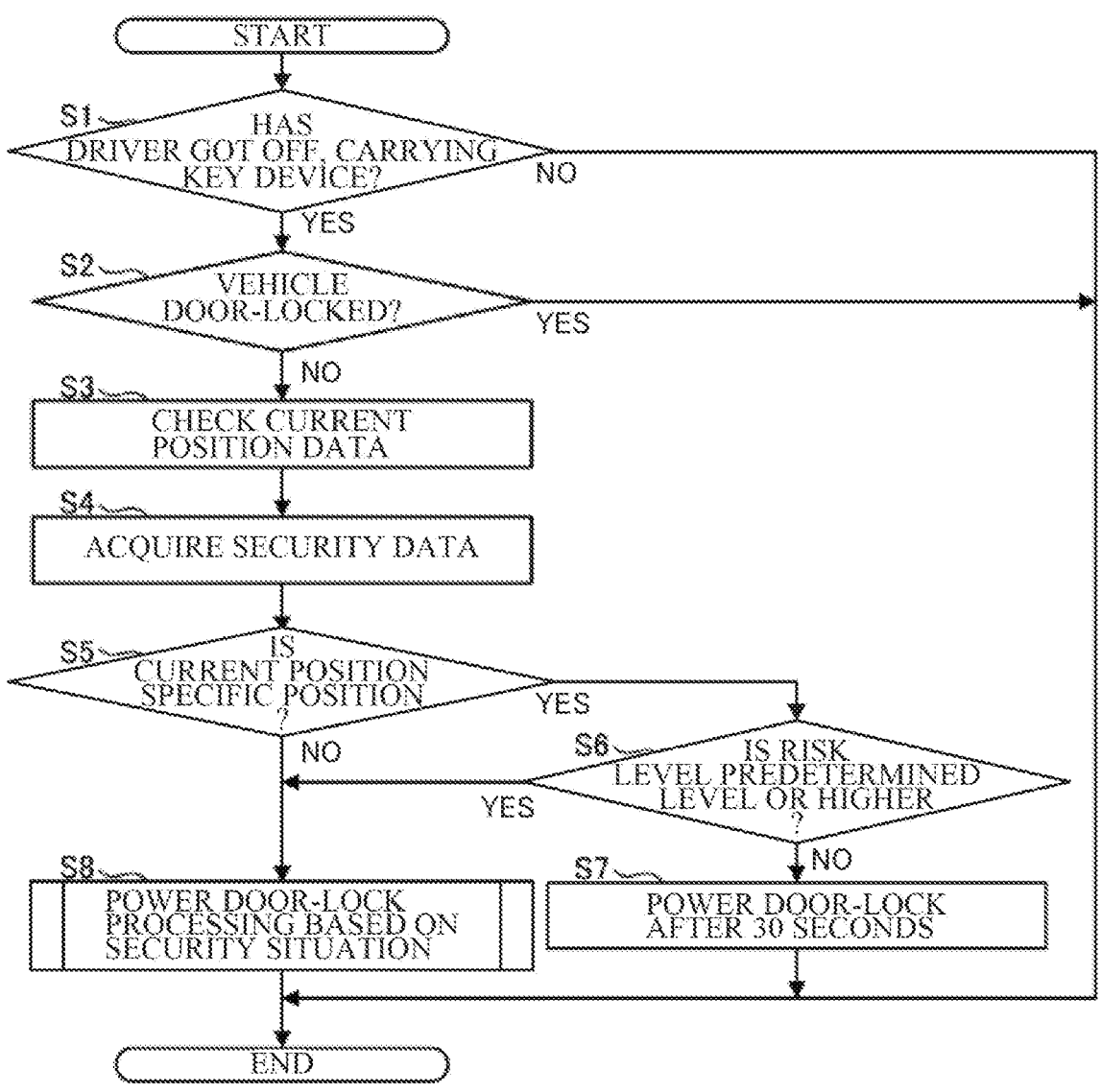
FIG. 2 is a processing flow of a power door-lock control of the power door-lock system according to the embodiment of the disclosure.

With reference to FIG. 2, description is given next of the processing flow of the power door-lock control of the power door-lock system M.

The power door-lock system M may monitor the driver's action and check whether or not the driver has got off, while carrying the key device of the vehicle 1 (step S1). The power door-lock system M may detect opening and closing of the door 32 by the driver's seat. When the screen data identifier 114 determines that the driver has got off, as the identification result of the screen data captured by the in-vehicle camera 41 and the key position identifier 113 determines that the key device is located outside the vehicle 1 as the identification result of the position data regarding the key device acquired by the key position detector 213, the power door-lock system M may determine that the driver has got off the vehicle 1, while carrying the key device.

When the power door-lock system M determines that the driver carrying the key device has got off (step S1; YES), the power door-lock system M may check whether or not the vehicle 1 has been door-locked by the driver (step S2). When the power door-lock system M does not determine that the driver carrying the key device has got off (step S1; NO), the power door-lock system M may end the door-lock control processing. The determination that the vehicle 1 has not been door-locked is assumed to be made when a certain period of time has elapsed since getting off of the driver, without receiving the door lock signal from the key device. The certain period of time as used here is a very short time, e.g., about 2 to 3 seconds.

After the driver gets off, when the vehicle 1 is not door-locked (step S2; NO), the power door-lock system M may check the current position data acquired by the current position data obtainer 211 (step S3), and allow the security data obtainer 212 to acquire the security data (step S4). After the driver gets off, when the vehicle 1 is door-locked by the driver (step S2; YES), the power door-lock system M may end the door-lock control processing. The power door-lock system M may also end the door-lock control processing even if it is not the timing of step S2, when the power door-lock is made by the driver before the power door-lock is made by the power door-lock system M while the door-lock control processing is being carried out.

When the security data is acquired, the current position identifier 111 may determine, by using the current position data, whether or not the current position of the vehicle 1 is the specific position. When it is determined that the current position of the vehicle 1 is the specific position, as the identification result by the current position identifier 111 (step S5; YES), the security situation identifier 112 may identify the security situation of the current position of the vehicle 1 by using the security data, and determine whether or not the risk level of the current position is equal to or higher than a predetermined level (step S6). When the risk level of the current position of the vehicle 1 is equal to or higher than the predetermined level (step S6; YES), the power door-lock system M may cause the flow to shift to power door-lock processing based on the security situation (step S8). When the risk level is lower than the predetermined level (step S6; NO), the power door-lock system M may make the power door-lock of the vehicle 1, 30 seconds after the driver gets off (step S7), and end the door-lock control processing. The predetermined level as used here is determined as appropriate in accordance with, for example, the user's awareness of the risk.

The power door-lock system M may also cause the flow to shift to the power door-lock processing based on the security situation (step S8) when the current position of the vehicle 1 is other than the specific position (step S5; NO). The power door-lock processing based on the security situation is described in detail with reference to the flow in FIG. 3. At an end of the power door-lock processing based on the security situation, the power door-lock system M may end the door-lock control processing.

Figure 3:
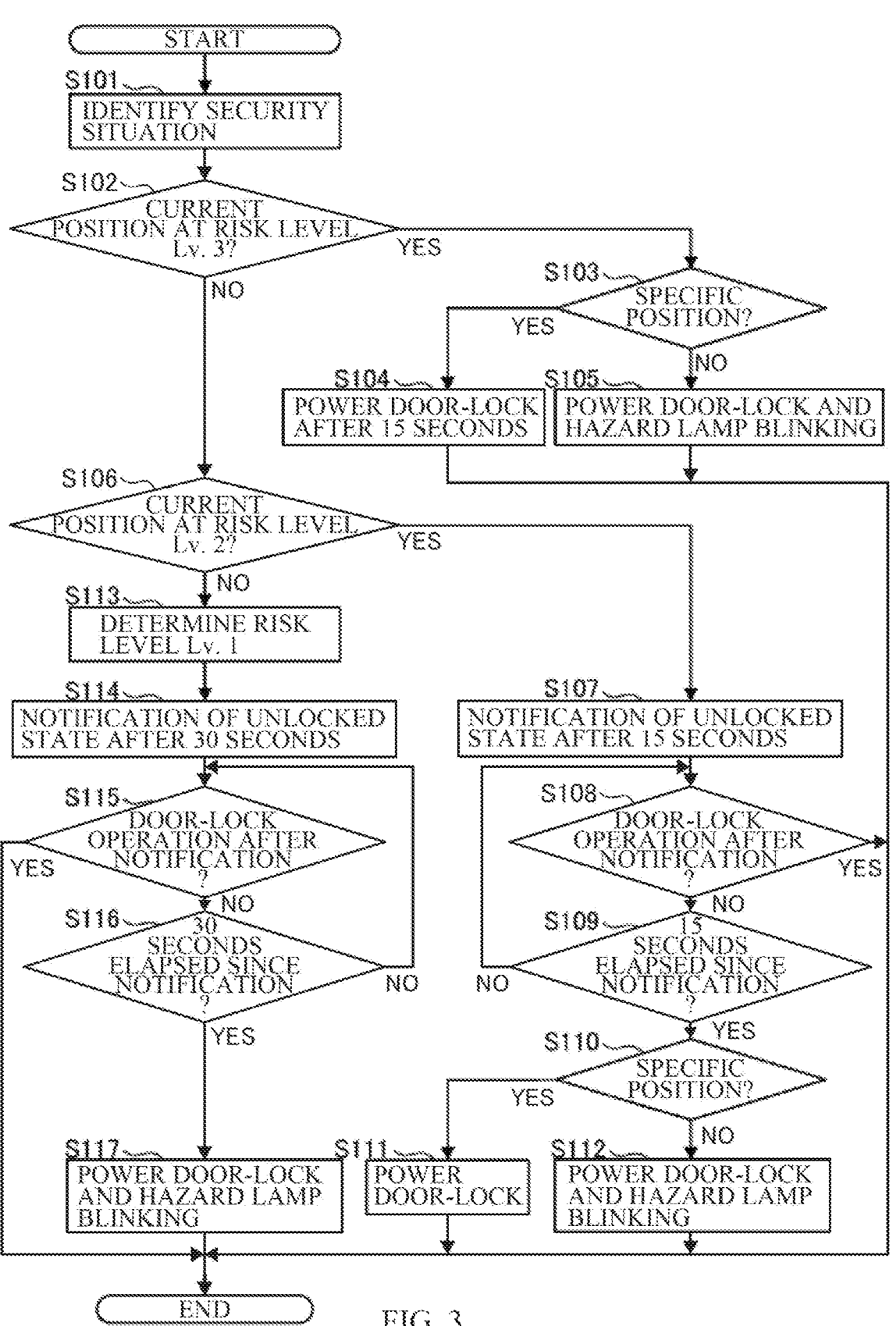
FIG. 3 is a processing flow of power door-lock processing based on a security situation, in the power door-lock control according to the embodiment of the disclosure.

With reference to FIG. 3, description is given of a processing flow of the power door-lock processing based on the security situation. As described, the power door-lock processing based on the security situation may be carried out when it is determined that the current position of the vehicle 1 is other than the specific position (step S5; NO) or when the current position is the specific position and the risk level is equal to or higher than the predetermined level (step S6; YES).

The security situation identifier 112 may compare the security data to the current position data, and identify the security situation at the current position of the vehicle 1 (step S101). When the identification of the security situation at the current position of the vehicle 1 is made in step S6, step S101 may be skipped. When the risk level of the current position of the vehicle 1 is identified as "3", that is, the risk level is "high" (step S102; YES), and the current position of the vehicle 1 is the specific position (step S103; YES), the power door-lock system M may make the power door-lock of the vehicle 1, 15 seconds after the determination that the driver has got off (step S104), and end the door-lock control processing. When the current position of the vehicle 1 is other than the specific position (step S103; NO), the power door-lock system M may make the power door-lock of the vehicle 1, 15 seconds after the determination that the driver has got off, blink the hazard lamp (step S105), and end the door-lock control processing. The blinking of the hazard lamp is performed to allow those around the vehicle 1 to recognize that the vehicle 1 is stopped, and is continued until the door-unlock of the vehicle 1 is made by the driver.

When the risk level of the current position of the vehicle 1 is identified as "2", that is, the risk level is "medium" (step S106; YES), the power door-lock system M may notify the terminal carried by the driver that the vehicle 1 is in the door-unlocked state, 15 seconds after the determination that the driver has got off (step S107). After the notification, when the door-lock of the vehicle 1 is made by the driver (step S108; YES), the power door-lock system M may end the door-lock control processing. The door-lock operation of the vehicle 1 by the driver may be monitored until 15 seconds elapse since the notification (step S109; NO).

After the notification, in a case where the door-lock of the vehicle 1 by the driver is not made (step S108; NO) and 15 seconds elapse (step S109; YES), when the current position of the vehicle 1 is the specific position (step S110; YES), the power door-lock system M may make the power door-lock of the vehicle 1 (step S111) and end the door-lock control processing. When the current position of the vehicle 1 is other than the specific position (step S110; NO), the power door-lock system M may make the power door-lock of the vehicle 1, blink the hazard lamp (step S112), and end the door-lock control processing.

When the risk level of the current position of the vehicle 1 is identified as "1", that is, the risk level is "low" (step S113), the power door-lock system M may notify the terminal carried by the driver that the vehicle 1 is in the door-unlocked state, 30 seconds after the determination that the driver has got off (step S114). After the notification, when the door-lock of the vehicle 1 is made by the driver (step S115; YES), the power door-lock system M may end the door-lock control processing. The door-lock operation of the vehicle 1 by the driver may be monitored until 30 seconds elapse since the notification (step S116; NO).

After the notification, when the door-lock of the vehicle 1 by the driver is not made (step S115; NO) and 30 seconds elapse (step S116; YES), the power door-lock system M may make the power door-lock of the vehicle 1, blink the hazard lamp (step S117), and end the door-lock control processing.

As described, in the power door-lock system M of this embodiment, the transition time from the door-unlocked state after the determination that the driver has got off to the power door-lock may be determined in accordance with the security situation of the region, to make the power door-lock after the elapse of the transition time. Hence, it is possible to suppress the theft of the vehicle 1 when the driver forgets the door-lock of the vehicle 1 in a region where the risk level is high.

Moreover, in a region where the risk level is low, the transition time to the power door-lock may be extended as compared with the region where the risk level is high, to make the power door-lock at appropriate timing. Hence, it is possible to suppress the user from feeling troublesome by repetition of the door-lock and the door-unlock of the vehicle 1.

Furthermore, when the data acquired by the security data obtainer 212 from the big data, etc. includes, for example, case time data regarding theft cases, the identification may be made based on not only the region but also the time. In other words, in the region where the risk level is high, the transition time to the power door-lock may be extended during a time zone with few theft cases. Even in the region where the risk level is low, the transition time to the power door-lock may be shortened during a time zone in which relatively more theft cases are confirmed.

The transition time to the power door-lock in accordance with the security situation illustrated in the flow in FIGS. 2 and 3 is merely an example of recommended time and may be changed as long as the transition time is varied with the risk level. Moreover, the identification of the current position as the specific position may be made not only based on the data acquired by the current position data obtainer 211 but also by using the screen data regarding the surroundings of the vehicle 1 captured by the in-vehicle camera 41.

MODIFICATION EXAMPLES

Description is given next of a power door-lock system M2 as a modification example. In the power door-lock system M2, the key position identifier 113 may receive identification data from the screen data identifier 114 and disable a particular one of the key devices. The in-vehicle ECUs constituting the power door-lock system M2 are the same as those of the power door-lock system M, and illustration thereof is omitted.

The disabling of the key device by the key position identifier 113 may be made as follows. When the door 32 is opened and closed, the screen data identifier 114 identifies the driver as having got off, and the key position identifier 113 identifies any one of the key devices as being located outside the vehicle 1, the key position identifier 113 may disable each of the key devices located inside the vehicle 1. That is, there are two or more key devices configured to make the door-lock and the door-unlock of the vehicle 1, and when it is determined that the driver has got off the vehicle 1, while carrying any one of the key devices, the key position identifier 113 may disable each of the key devices located inside the vehicle 1.

In one embodiment of the disclosure, any one of the key devices identified as being located outside the vehicle 1 may serve as a "first one of the key devices". In one embodiment of the disclosure, each of the key devices located inside the vehicle 1 may serve as a "second one of the key devices".

Some vehicles are configured to make the door-lock and the door-unlock by using a smart key or a digital key. In such a vehicle, when the key device is located inside the vehicle, the door-lock is not activated to prevent the key device from being locked in the vehicle, with the driver excluded from the vehicle. Thus, in the power door-lock system M2 of this modification example, when the driver gets off, while carrying any one of the key devices, the key position identifier 113 may disable each of the key devices located inside the vehicle 1, to make the power door-lock of the vehicle 1, with the key devices located inside the vehicle 1.

In the power door-lock system M2, when the screen data identifier 114 identifies the driver as having got off, the screen data identifier 114 may transmit the identification data to the key position identifier 113. When the key position identifier 113 identifies any one of the key devices as being located outside the vehicle 1, and identifies one or more of the key devices as being located inside the vehicle 1, based on the identification data received from the screen data identifier 114, the key position identifier 113 may disable each of the key devices located inside the vehicle 1.

Figure 4:
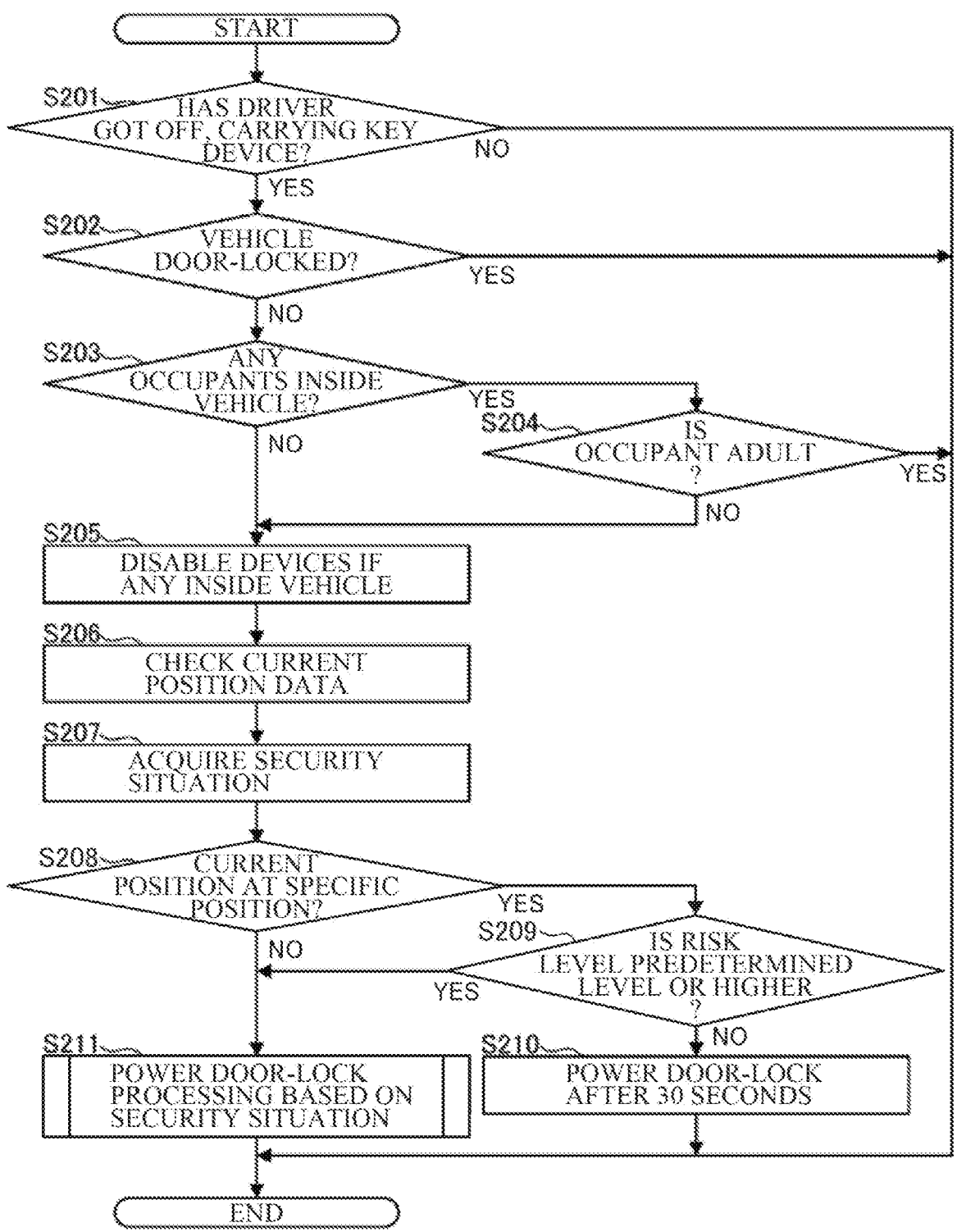
FIG. 4 is a modification example of the processing flow of the power door-lock control of the power door-lock system according to the embodiment of the disclosure.

With reference to FIG. 4, description is given of a processing flow of a power door-lock control of the power door-lock system M2.

The power door-lock system M2 may monitor the driver's action and check whether or not the driver has got off, while carrying any one of the key devices of the vehicle 1 (step S201). When the power door-lock system M2 confirms that the driver has got off, carrying any one of the key devices (step S201; YES), the power door-lock system M2 may check whether or not the vehicle 1 has been door-locked by the driver (step S202). The determination that the door-lock of the vehicle 1 has not been made is assumed to be made on a condition that a certain period of time has elapsed since the getting off of the driver, without receiving the door-lock signal from the key device. The certain period of time as used here may be, for example, a very short time, e.g., about 2 to 3 seconds.

After the driver gets off, when the power door-lock system M2 determines that the vehicle 1 is not door-locked (step S202; NO), the power door-lock system M2 may determine presence or absence of any occupants in the vehicle 1 (step S203). After the driver gets off, when the vehicle 1 is door-locked by the driver, the power door-lock system M2 may end the door-lock control processing (step S202; YES). Moreover, as with the power door-lock system M, the power door-lock system M2 may also end the door-lock control processing even if it is not the timing of step S202, when the power door-lock is made by the driver before the power door-lock is made by the power door-lock system M2 while the door-lock control processing is being carried out.

When the power door-lock system M2 determines the presence of an occupant in the vehicle 1 (step S203; YES), the power door-lock system M2 may determine whether or not the occupant is an adult (step S204). When the power door-lock system M2 determines that the occupant is an adult, the power door-lock system M2 may end the door-lock control processing without making the power door-lock (step S204; YES) because a risk of theft of the vehicle 1 with an adult on board is possibly low and the adult occupant may possibly be going to drive the vehicle 1.

In a case where no occupants are confirmed (step S203; NO), or in a case where the occupant is not identified as an adult (step S204; NO), when any key devices are located inside the vehicle 1, the key position identifier 113 may disable the key devices located inside the vehicle 1 (step S205). When no key devices are confirmed inside the vehicle 1, the disabling is not performed.

When the key devices located inside the vehicle 1 are disabled by the key position identifier 113, the power door-lock system M2 may check the current position data acquired by the current position data obtainer 211 (step S206) and allow the security data obtainer 212 to acquire the security data (step S207).

When the security data is acquired, the current position identifier 111 may determine whether or not the current position of the vehicle 1 is the specific position, by using the current position data. As the identification result by the current position identifier 111, when it is determined that the current position of the vehicle 1 is the specific position (step S208; YES), the security situation identifier 112 may identify the security situation of the current position of the vehicle 1 by using the security data, and determine whether or not the risk level of the current position is equal to or higher than the predetermined level (step S209). When the risk level of the current position of the vehicle 1 is equal to or higher than the predetermined level (step S209; YES), the power door-lock system M2 may cause the flow to shift to the power door-lock processing based on the security situation (step S211). When the risk level is lower than the predetermined level (step S209; NO), the power door-lock system M2 may make the power door-lock, 30 seconds after the driver gets off (step S210), and end the door-lock control processing. The predetermined level as used here is determined as appropriate in accordance with the user's awareness of the risk.

When the current position of the vehicle 1 is other than the specific position (step S208; NO), the power door-lock system M2 may also cause the flow to shift to the power door-lock processing based on the security situation (step S211). The power door-lock processing based on the security situation is the same as that described with reference to the flow in FIG. 3, and the description thereof is omitted. At the end of the power door-lock processing based on the security situation, the power door-lock system M2 may end the door-lock control processing.

As described, in the power door-lock system M2, allowing the key position identifier 113 to disable each of the key devices located inside the vehicle 1 makes it possible to make the power door-lock, with the key devices located inside the vehicle 1. This leads to more remarkable effects of theft suppression. Moreover, the disabling of each of the key devices located inside the vehicle 1 makes it possible to prevent a start-up of the vehicle even if the thief intrudes into the vehicle 1. This leads to suppression of the theft of the vehicle 1.

Furthermore, in the power door-lock system M2, when the driver gets off the vehicle, the screen data identifier 114 may identify the occupant. In accordance with the identification result, the power door-lock system M2 may determine to refrain from making the power door-lock. Hence, it is possible to suppress the unnecessary power door-lock in the situation as described in step S204 in FIG. 4, leading to enhanced convenience of the vehicle 1.

According to the aspects of the disclosure, it is possible to control the power door-lock based on the security situation of the current position of the vehicle. Hence, it is possible to suppress the user from feeling troublesome, while suppressing vehicle-related theft.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The power door-lock ECU 10, the communication ECU 20, the door-lock ECU 30, and the camera ECU 40 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the power door-lock ECU 10, the communication ECU 20, the door-lock ECU 30, and the camera ECU 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the power door-lock ECU 10, the communication ECU 20, the door-lock ECU 30, and the camera ECU 40 illustrated in FIG. 1.

The invention claimed is:

1. A power door-lock system comprising:
   a door-lock controller configured to control a power door-lock of a vehicle;
   a current position data chip configured to acquire position data regarding a current position of the vehicle;
   a security data chip configured to acquire regional security data for a geographic area including the current position of the vehicle, the regional security data including at least a count of vehicle-related theft cases for the geographic area; and an electronic control unit configured to:

identify a risk level for the geographic area based on the position data and the regional security data;

upon determining that a driver has exited the vehicle, determine a transition time based on the identified risk level; and upon expiration of the transition time, cause the door-lock controller to actuate the power door-lock.

2. The power door-lock system according to claim 1, further comprising a key position detector chip, wherein the vehicle includes key devices, the key position detector chip is configured to detect respective positions of the key devices, and the electronic control unit is further configured to:

identify positions of the key devices based on detection by the key position detector chip, and upon identifying that a first one of the key devices is located outside the vehicle, cause the door-lock controller to actuate the power door-lock, even when a second one of the key devices is identified as being located inside the vehicle, the second one of the key devices being different from the first one of the key devices.

3. The power door-lock system according to claim 2, wherein the electronic control unit is configured to disable the second one of the key devices.

4. The power door-lock system according to claim 1, wherein the electronic control unit is further configured to:

determine, based on the position data acquired by the current position data chip, whether the current position of the vehicle is a specific position; and upon determining that the current position of the vehicle is other than the specific position, cause a hazard lamp of the vehicle to blink when the power door-lock is actuated.

5. The power door-lock system according to claim 1, wherein the transition time decreases as the identified risk level increases.

6. The power door-lock system according to claim 1, wherein the electronic control unit is configured to adjust the transition time based on a time-of-day associated with vehicle-related theft cases included in the regional security data.

7. A power door-lock system comprising circuitry configured to control door-lock of a vehicle, and acquire position data regarding a current position of the vehicle and regional security data for a geographic area including the current position of the vehicle, the regional security data including at least a count of vehicle-related theft cases for the geographic area, the circuitry being configured to:

identify a risk level for the geographic area based on the position data and the regional security data;

upon determining that a driver has exited the vehicle, determine a transition time based on the identified risk level; and upon expiration of the transition time, cause the door-lock controller to actuate the power door-lock.

8. A power door-lock system comprising:

a door-lock controller configured to control door-lock of a vehicle;

a current position data chip configured to acquire position data regarding a current position of the vehicle;

a security data chip configured to acquire security data regarding a region including the current position of the vehicle;

a security situation chip configured to identify a security situation of the current position of the vehicle based on the position data and the security data;

a key position detector chip; and a key position identifier chip, wherein the power door-lock system is configured to determine, based on the security situation identified by the security situation chip, transition time from a door-unlocked state of the vehicle after a determination that a driver of the vehicle has got off to power door-lock, and allow the door-lock controller to make the power door-lock after an elapse of the transition time, the vehicle includes key devices, the key position detector chip is configured to detect respective positions of the key devices, the key position identifier chip is configured to identify key position data detected by the key position detector chip, and the power door-lock system is configured to, when the key position identifier chip identifies a first one of the key devices as being located outside the vehicle, make the power door-lock despite that the key position identifier chip identifies a second one of the key devices as being located inside the vehicle, the second one of the key devices being different from the first one of the key devices.

9. The power door-lock system according to claim 8, wherein the key position identifier chip is configured to disable the second one of the key devices.

* * * * *